United States Patent [19]

Doré'

[11] 4,320,632
[45] Mar. 23, 1982

[54] SLIDING UNIVERSAL JOINTS NOTABLY FOR AUTOMOBILE VEHICLE TRANSMISSIONS

[75] Inventor: Jacques P. Doré', Colombes, France

[73] Assignees: Societe Anonyme Automobiles Citroen; Automobiles Peugeot, both of Paris, France

[21] Appl. No.: 84,598

[22] Filed: Oct. 15, 1979

[30] Foreign Application Priority Data

Oct. 27, 1978 [FR] France ................. 78 30648

[51] Int. Cl.³ ................................ F16D 3/30
[52] U.S. Cl. ................................ 64/21; 64/8
[58] Field of Search ........................ 64/21, 8

[56] References Cited

U.S. PATENT DOCUMENTS

| | | | |
|---|---|---|---|
| 2,235,002 | 3/1941 | Anderson | 64/21 |
| 3,367,139 | 2/1968 | Ristau | 64/21 |
| 3,757,534 | 9/1973 | Orain | 64/21 |
| 3,789,626 | 2/1974 | Girguis | 64/21 |
| 3,906,747 | 9/1975 | Orain | 64/21 |
| 4,083,202 | 4/1978 | Westercamp | 64/21 |
| 4,196,598 | 4/1980 | Hirai et al. | 64/32 R |

Primary Examiner—Ira S. Lazarus
Assistant Examiner—Magdalen Moy
Attorney, Agent, or Firm—Stevens, Davis, Miller & Mosher

[57] ABSTRACT

A universal joint comprising a bowl-shaped drive element connected to a drive shaft and having at least two ball races cooperating with rollers borne by a hub connected to a driven shaft, stop means being provided at the open end of the drive element. These drive means are arranged so that when a roller is supported against these means a part of this roller is outside the drive element, the center of the roller thus retained being situated in the vicinity of the open end. The universal joint is useful for tripod type joints for vehicle transmissions.

4 Claims, 9 Drawing Figures

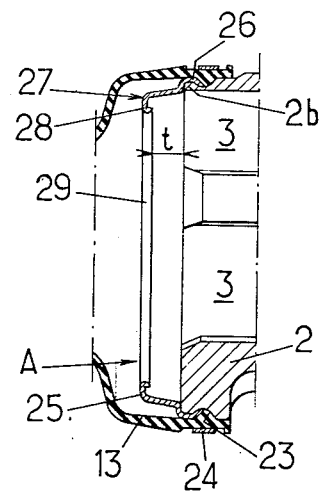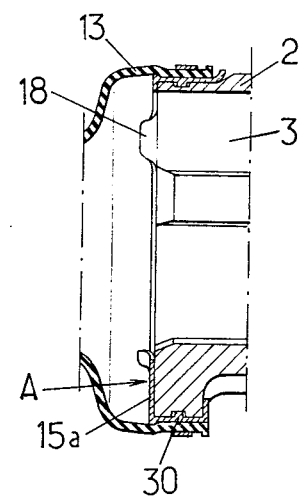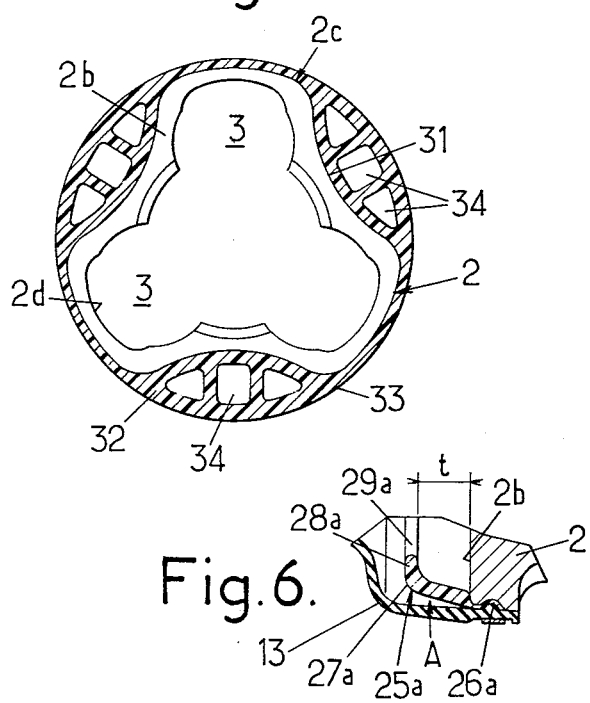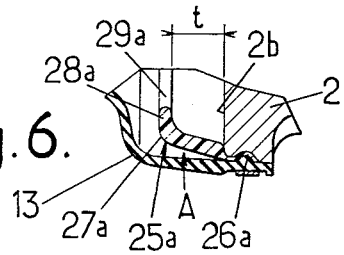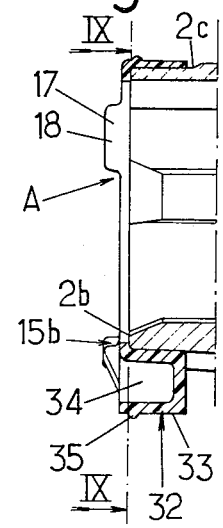

SLIDING UNIVERSAL JOINTS NOTABLY FOR AUTOMOBILE VEHICLE TRANSMISSIONS

BACKGROUND OF THE INVENTION

The invention relates to sliding universal joints, notably for automobile vehicle transmissions, of the type which comprise a substantially bowl-shaped drive element connected to a drive shaft and having at least two ball races cooperating with rollers borne by a hub connected to a driven shaft, with stop means provided at the open end of the drive element to retain the rollers and the end of the driven shaft inside this drive element.

More particularly, the invention relates to sliding universal joints of the tripod type having three parallel rectilinear ball races spaced circumferentially by 120°.

It is a particular object of the invention to render these universal joints responsive to the various exigencies of practice better than hitherto and notably such that their production is more economical, without resulting in drawbacks during the operations of assembly of the joint or during its operation.

GENERAL DESCRIPTION OF THE INVENTION

According to the invention, a sliding universal joint of the previously defined type is characterized by the fact that the aforesaid stop means are arranged so that when a roller is supported against these means a portion of this roller is outside the drive element while the center of the roller thus retained is near the open end of this element, and the axial length of the drive element is selected so that the aforesaid ball races have sufficient length to permit useful travel of the rollers to be ensured.

Preferably, the assembly is arranged so that when the roller is supported against the stop means the center of this roller is inside said drive element.

The stop means may comprise a cup having a central opening for the passage of the driven shaft bordered by indentations designed to become extensions of the ball races, these indentations being limited in the circumferential direction by tongues projecting outwards in the longitudinal direction with respect to the open end of the drive element, these tongues having a concave inner surface, notably spherical, the edges of the tongues furthest from the drive element defining an opening whose size is sufficiently small to retain a roller.

Preferably, this cup includes, flat walls between the indentations designed to be supported against the open end of the drive element.

According to another possibility, the stop means may comprise a sleeve with a frustoconical surface whose large base surrounds the open end of the drive element, this sleeve projecting longitudinally outwards with respect to the drive element, the small base of the frustoconical surface being spaced axially from the open end of the drive element and comprising a rim adapted to retain the rollers.

The stop means can be formed of molded plastics material.

In a modification, the stop means can be formed of sheet steel.

The assembly of the stop means on the drive element is advantageously ensured by engagement of the stop means in a groove provided at the periphery of the end of the drive element for the fastening of a sealing sheath; this system of spring-catch type assembly relates more particularly to stop means formed of plastics material.

The stop means, notably when formed of sheet metal, in another embodiment be crimped on the drive element.

When this drive element has an outer surface whose contour is substantially parallel with the contour of its inner surface so that this outer surface includes concave zones located angularly between the ball races, it is advantageous to provide stop means of molded plastics material arranged so as to include a collar adapted to be engaged on the outer surface of the drive element to compensate for the concave zones, and whose outer surface is entirely convex, notably a cylinder of revolution, so as to be able to serve as a support for the end of a sealing sheath.

The invention relates also to stop means for a sliding universal joint of the previously defined type, characterized by the fact that they are arranged so that when the roller is supported against these means a part of this roller is outside the drive element, while the center of the roller thus retained is near the open end of this element, notably inside said drive element, and the axial length of the drive element is selected so that the abovesaid drive means have just sufficient length to ensure useful travel of the rollers.

The invention consists, apart from the above-outlined features, of certain other features which will be more explicitly considered below, with regard to particular embodiments described with reference to the accompanying drawings, but which are not to be taken as in any way limiting.

BRIEF DESCRIPTION OF THE DRAWINGS

FIG. 5 is a partial axial section of a modification of the universal joint according to the invention.

FIG. 6 shows, in section, a detail of another embodiment of a universal joint according to the invention.

FIG. 7 is a partial axial section of yet another embodiment.

FIG. 8 is a partial axial section of an embodiment for a drive element whose outer surface is substantially parallel with the inner surface.

FIG. 9 is a section along the line IX—IX of FIG. 8.

DESCRIPTION OF PREFERRED EMBODIMENTS

Figure 1:
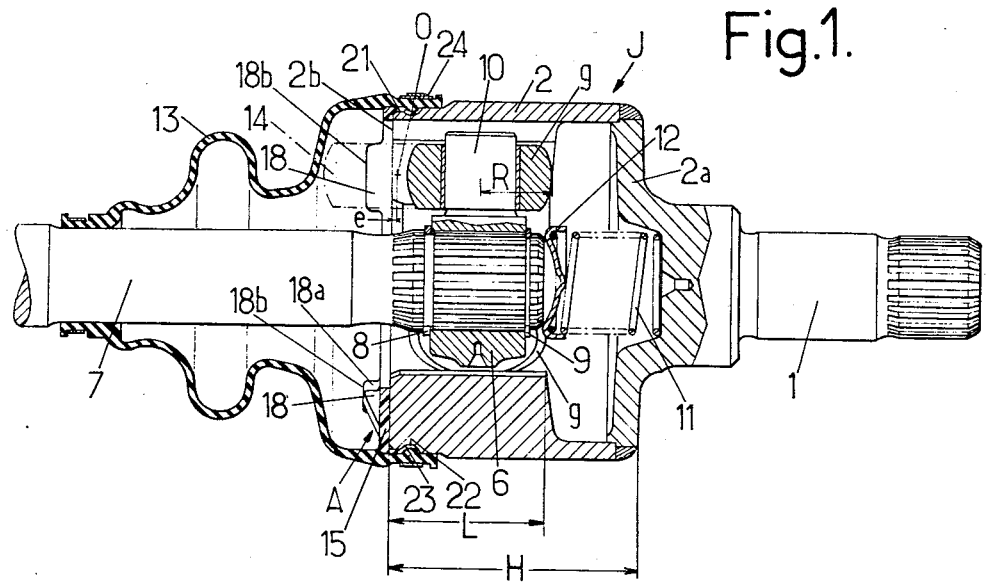
FIG. 1 is an axial section of an embodiment of a sliding universal joint of the tripod type according to the invention.

Referring to the drawings, more particularly to FIG. 1, a sliding universal joint J of the tripod type for an automobile vehicle transmission can be seen. Such a joint is currently mounted, for example, in front wheel drive vehicles at the output from the differential; the joint J includes a drive shaft 1 connected, for example, to a differential (not shown); a substantially bowl-shaped drive element 2 is connected to the shaft 1. The drive element 2 has three rectilinear ball races 3 (FIG. 2), substantially parallel to the axis of the shaft 1, spaced regularly angularly by 120°. The outer surface of the element 2 in FIGS. 1, 2, 5, 6 and 7 is a cylinder of revolution.

The ball races 3 are formed by grooves whose sides 4,5 are bounded by cylindrical concave surfaces, whose generators are substantially parallel to the axis of the shaft 1, and whose concavity is turned towards the bearing or ball race 3.

Each ball race 3 cooperates with a roller g borne by a hub 6 connected to a driven shaft 7. As seen in FIG. 1, the hub 6 is connected in rotation to the shaft 7 by a set of grooves and longitudinal ribs provided respectively on the shaft and in a bore of the hub 6 engaged around the shaft 7. The locking, in the axial direction, of the hub 6 with respect to the shaft 7 is ensured by two elastic split rings 8, 9 anchored in grooves provided on the shaft 7.

Each roller g has the shape of a spherical segment and is mounted in free rotation on a radial pivot 10 of the hub 6. Three pivots 10, angularly displaced by 120°, therefore project on the periphery of the hub 6.

Each roller g can slide and turn freely in the associated ball race 3, the spherical surface of this roller being in contact with the sides 4 and 5.

In the previously considered example of a front wheel drive vehicle, the driven shaft 7 is connected through a universal joint (not shown) to a front driving and steering wheel.

An elastic means, notably formed by helical compression spring 11, can be arranged between the bottom 2a of the drive element and a cup 12 supported against the end of the driven shaft 7 and situated inside the drive element 2. The spring 11 exerts an axial force on the shaft 7 for the centering of the hub 6 in the drive element 2.

The end 2b of the element 2, spaced from the bottom 2a, is open. The stop means A are provided at this open end 2b to retain the rollers g, and hence the hub 6 and the end of the shaft 7, inside the drive element 2. A sealing sheath 13, formed by a bellows of elastomeric material, surrounds, on the one hand, the open end 2b of the drive element 2 and on the other hand, the driven shaft 7.

The stop means A are arranged so that when a roller g is supported against these means A (as shown in broken line in FIG. 1 and in solid line in FIG. 4), a part 14 of this roller is outside the drive element 2, while the center 0 of the roller thus retained is near the open end 2b of the element. By the expression near, is meant that the distance e between the center 0 of the roller, retained by the means A, and the end 2b, is very much less than the radius R of the roller (e<<R). Advantageously, e/R is less than 1/10 (one tenth) (e<R/10).

The assembly is arranged generally, so that the center 0 of the roller g thus retained is inside the drive element 2.

The axial length H of the drive element 2 is selected so that the ball races 3 have a length L sufficient to ensure useful travel of the rollers g.

In the embodiment of FIGS. 1 to 4, the stop means A comprise a cup 15 having a central opening 16 for the passage of the driven shaft 7; the dimensions of this opening 16 are sufficient to permit angular movements of the shaft 7. This opening 16 is bordered by three indentations 17, distributed regularly in the circumferential direction. These indentations 17 are designed to become extensions of the ball races 3 so as to permit the part 14 of the roller g to project beyond the end 2b.

These indentations 17 are limited, in the circumferential direction, by tongues 18 projecting outwardly in the longitudinal direction as seen in FIG. 1 with respect to the open end 2b.

Figure 3:
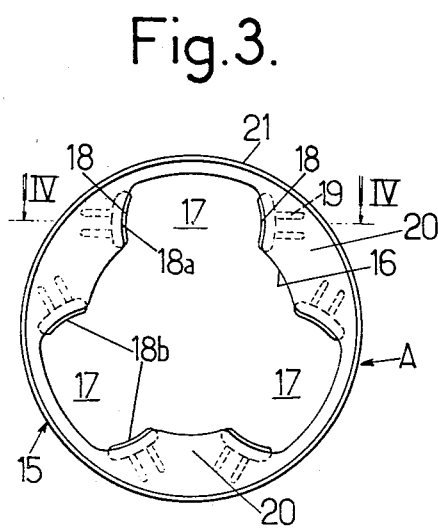
FIG. 3 is a view from the right, with respect to FIG. 1, of the stop means formed by a cup.
Figure 2:
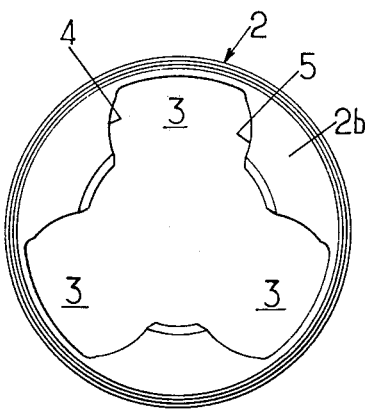
FIG. 2 is a view, from the left with respect to FIG. 1, of the drive element of the joint.
Figure 4:
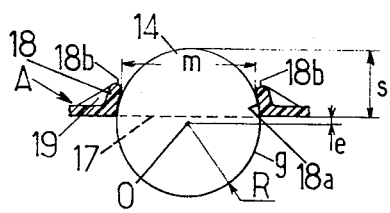
FIG. 4 is a partial section along the line IV—IV of FIG. 3.

Two tongues 18, as seen from FIGS. 3 and 4, are provided on each side of each indentation 17. Stiffening gussets 19 are provided for reinforcing these tongues 18 and for increasing their resistance to separation under the effect of the thrust of a roller g.

The tongues 18 have a spherical concave inner surface 18a; the edges 18b (see notably FIGS. 3 and 4) of the tongues, furthest from the drive element 2, define an opening whose dimension m in a plane of section passing through the center of the corresponding roller which is perpendicular to the axis of the pivot 10 is sufficiently small to retain a roller g. This roller, when it abuts against the inner surfaces 18a of the tongues 18, as shown in FIG. 4, projects by the part 14 on the open end 2b, the center 0 of the roller is near the end 2b.

The cup 15 includes, between the indentations 17, flat walls 20 designed to be supported against the open end 2b of the drive element 2; the plane of the walls 20, when the cup 15 has been placed in position, is perpendicular to the axis of the drive element 2.

The cup 15 includes, on its outer edge, a substantially cylindrical skirt 21 adapted to surround the outer end surface of the drive element 2. This skirt 21 includes a bead 22 with a semi-circular cross-section projecting inwardly and having a concave surface outwardly; this bead 22 is designed to be clipped, that is to say to penetrate by spring-catch engagement a peripheral groove 23 of the drive element 2, to ensure the fixing of the cup 15. The concave surface towards the outside of the bead 22 defines a groove adapted to receive a latching engagement beading of the sealing sheath 13. The latter is held around the drive element 2 by a clamp 24.

The cup 15 is advantageously formed of molded plastics material.

Referring to FIG. 5, a modified embodiment can be seen in which the stop means A comprise a metal sleeve 25 of sheet steel with a frustoconical surface, whose large base 26 surrounds the open end 2b of the drive element 2. The sleeve 25 is also clipped or spring engaged at its base 26 in the groove 23 of the drive element 2. The small base 27 of the sleeve is axially spaced from the drive element 2; it includes a rim 28 projecting radially inwards which is adapted to retain the rollers. This rim 28 bounds a circular opening 29 permitting the passage and the angular movement of the shaft 7.

FIG. 6 shows an embodiment in which a frustoconical sleeve 25a, similar to the sleeve 25 of FIG. 5, is formed of plastics material and is held by spring-catch engagement on the end of the drive element 2. The various parts of this sleeve 25a similar to parts described with reference to to FIG. 5 are denoted by the same numerals followed by the letter a, so that their redescription is unnecessary.

It is clear that the sleeves 25, 25a as well as the axial distances t of the rims 28, 28a with respect to the open end 2b are determined so that when a roller is supported against this rim, this roller is in the previously defined position with reference to FIGS. 1 to 4.

In FIG. 7 can be seen a modification of sheet metal of a cup 15a similar to the cup 15 in FIGS. 1 to 4. The cup 15a includes a cylindrical skirt 30 surrounding the circular end of the drive element 2. The tongues of this cup 15a similar to those of FIGS. 1, 3 and 4 are denoted by the same reference numerals 18. The fastening of the cup 15a on the drive element 2 is ensured by crimping of the cylindrical skirt 30 on the end of the drive element 2.

FIGS. 8 and 9 show a particularly advantageous embodiment in the case where the drive element 2 has an outer surface 2c substantially parallel with the inner surface 2d of this element. The surface 2c, then, is no longer a cylinder of revolution, but has concave zones 31 (FIG. 9) situated angularly between the ball races 3. Such an embodiment of the drive element 2 permits economy in relatively expensive material.

The stop means A are then arranged in the form of a cup 15b similar, for the part situated against the open end 2b, to the cup 15 of FIG. 1; that is to say, this cup 15b includes opening 17 bordered by tongues 18 identical with those of FIGS. 1, 3 and 4.

This cup 15b includes, in addition, a collar 32 adapted to be engaged on the outer surface 2c and to compensate the concave zones 31 so that the outer surface 33 of this collar is entirely convex, notably a cylinder of revolution. It hence appears, notably from FIG. 9, that the thickness of this collar 32 in the radial direction is variable in order to ensure the compensation for the concave zones 31; cavities 34 can be provided in the zones of greatest radial thickness of this collar 32.

Advantageously, this collar is formed of plastics material and is overmolded around the end of the element 2. The locking of the collar 32 with respect to the element 2 can be ensured by a set of notches and peripheral ribs (not shown in FIG. 8).

The outer surface 33 includes a peripheral bead 35 adapted to cooperate with the sealing sheath which surrounds the cylindrical surface 33. The fixing of the sheath can thus be correctly ensured against a cylindrical surface.

Whatever the embodiment adopted, the stop means A provided by the invention, enable, in all cases, the desired useful travel for the rollers g to be ensured, with a minimum of length H of the drive element 2. It can be said that for a given useful travel, the invention enables the axial length of the drive element 2 to be reduced from the value s (FIG. 4) by which the roller g projects from the drive element 2 with respect to a conventional solution in which a transverse wall is provided at the end of the drive element to retain the rollers g inside the drive element 2.

This economy is substantial since it bears on relatively expensive material, while permitting appreciable lightening of the part. Economies in the machining operations are also realized since the ball races 3, for a same useful length of travel of the rollers g, have a smaller length.

This economy is obtained without creating a drawback in the assembly of the joint since the stop means A ensure the holding of the rollers g inside the drive element 2, even in the case of a solution including the spring 11 exerting a thrust on the driven elements.

It is clear that the invention can be applied to any type of sliding universal transmission joint, the joint of the tripod type described with reference to the drawings only constituting a particular case.

The term "roller" used in the description and in the claims must be understood in a wide sense as denoting any bearing member, notably a ball bearing.

I claim:

1. A sliding universal joint for an automobile transmission comprising a substantially bowl-shaped drive element connected to a drive shaft and having at least two ball races cooperating with rollers borne by a hub connected to a driven shaft, stop means at the open end of the drive element for retaining the rollers and the end of the driven shaft inside the drive element, said stop means being arranged so that when a roller is supported against the stop means, a part of this roller is outside the drive element while the center of the roller thus retained is near the open end of this element, the axial length of the drive element being selected so that said ball races have sufficient length to permit useful travel of the rollers; said stop means comprising a cup having a central opening for the passage of the driven shaft bordered by indentations for becoming extensions of the ball races, these indentations being bounded, in the circumferential direction, by tongues projecting outwards in the longitudinal direction with respect to the open end of the drive element, these tongues having a concave inner surface, the edges of the tongues furthest from the drive element defining an opening whose size is sufficiently small to retain a roller.

2. Universal joint according to claim 1, wherein the concave inner surface of the tongues is spherical.

3. A sliding universal joint for an automobile transmission comprising a substantially bowl-shaped drive element connected to a drive shaft and having at least two ball races cooperating with rollers borne by a hub connected to a driven shaft, stop means being provided at the open end of the drive element for retaining the rollers and the end of the driven shaft inside the drive element, said stop means being arranged so that when a roller is supported against the stop means, a part of this roller is outside the drive element while the center of the roller thus retained is near the open end of this element, the axial length of the drive element being selected so that said ball races have sufficient length to permit useful travel of the rollers; said stop means being arranged so that when a roller is supported against these means a part of this roller is outside the drive element, while the center of the roller thus retained is inside and near the open end of said drive element, and the axial length of the drive element is selected so that said ball races have sufficient length to ensure useful travel of the rollers, and wherein said stop means comprises a cup formed from molded plastics material having a central opening for the passage of the driven shaft bordered by indentations designed to become extensions of the ball races, these indentations being limited in the circumferential direction by tongues projecting outwards in a longitudinal direction with respect to the open end of the drive element, these tongues having a concave inner surface, the edges of the tongues furthest from the drive element defining an opening whose size is sufficiently small to retain a roller.

4. Universal joint according to claim 3, wherein said inner surface of the tongues is spherical.

* * * * *